US010482161B2

(12) United States Patent
Chan et al.

(10) Patent No.: US 10,482,161 B2
(45) Date of Patent: Nov. 19, 2019

(54) GENERATING AND DISPLAYING ACTIVE REPORTS

(71) Applicant: ORACLE INTERNATIONAL CORPORATION, Redwood Shores, CA (US)

(72) Inventors: Yuen Sheung Chan, San Ramon, CA (US); Benoit Dageville, Truckee, CA (US); Hsiao-Te Su, Palo Alto, CA (US); Peter Clayton Belknap, Redwood City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 573 days.

(21) Appl. No.: 14/924,429

(22) Filed: Oct. 27, 2015

(65) Prior Publication Data

US 2016/0048480 A1   Feb. 18, 2016

Related U.S. Application Data

(63) Continuation of application No. 12/701,380, filed on Feb. 5, 2010, now Pat. No. 9,208,141.

(51) Int. Cl.
*G06F 17/22* (2006.01)
*G06F 17/21* (2006.01)
(Continued)

(52) U.S. Cl.
CPC ............ *G06F 17/212* (2013.01); *G06F 16/25* (2019.01); *G06F 16/958* (2019.01);
(Continued)

(58) Field of Classification Search
CPC .. G06F 17/24; G06F 17/2247; G06F 17/2235; G06F 17/248; G06F 17/30887;
(Continued)

(56) References Cited

U.S. PATENT DOCUMENTS 5,940,843 A    8/1999  Zucknovich
6,216,164 B1 * 4/2001  Zaremba, Jr. ..... G06F 17/30893
                                          707/E17.117
(Continued)

OTHER PUBLICATIONS

Bakshi, et al., Crystal Report 2008, Altidan White Paper, Apr. 2008, 10 pages.
(Continued)

*Primary Examiner* — Thu V Huynh
(74) *Attorney, Agent, or Firm* — Tucker Ellis LLP

(57) ABSTRACT

Embodiments of the present invention enable the generation and display of active reports. Applications of the present invention include its use in embodiments of a web-based product for managing an Information Technology (IT) infrastructure although the present invention is not limited to such applications. In embodiments, an active report is an active report file comprising report data and a user interface (UI) reference to a network location of code that defines an interactive UI comprising graphical user interface (GUI) components to be rendered when displaying the report data. In embodiments, the interactive UI is defined by UI code (such as an Adobe Flash Small Web Format (SWF) file) that also defines the UI of a rich internet application (RIA). In embodiments, the UI reference may be a link designating a location to the location of the UI code on a network, such as the Internet.

18 Claims, 17 Drawing Sheets

(51) Int. Cl.
*G06F 16/25* (2019.01)
*G06F 16/958* (2019.01)
*G06F 17/24* (2006.01)
*G06Q 10/10* (2012.01)

(52) U.S. Cl.
CPC ...... *G06F 17/2235* (2013.01); *G06F 17/2247* (2013.01); *G06F 17/248* (2013.01); *G06Q 10/107* (2013.01)

(58) Field of Classification Search
CPC .. G06F 17/30557; G06F 17/212; G06F 16/25; G06F 16/958; G06Q 10/107
See application file for complete search history.

(56) References Cited

U.S. PATENT DOCUMENTS

| | | | |
|---|---|---|---|
| 6,757,681 B1* | 6/2004 | Bertram | H04L 43/022 |
| 6,885,997 B1 | 4/2005 | Roberts | |
| 7,287,229 B2 | 10/2007 | Forkner | |
| 7,673,340 B1 | 3/2010 | Cohen | |
| 8,522,215 B1 | 8/2013 | Aldrich | |
| 2002/0175934 A1 | 11/2002 | Hand | |
| 2003/0204498 A1 | 10/2003 | Lehnert | |
| 2003/0212960 A1 | 11/2003 | Shaughnessy | |
| 2004/0039990 A1* | 2/2004 | Bakar | G06F 17/243 715/222 |
| 2005/0216421 A1* | 9/2005 | Barry | G06F 11/0709 705/64 |
| 2005/0223073 A1* | 10/2005 | Malik | H04L 51/14 709/206 |
| 2005/0278307 A1* | 12/2005 | Battagin | G06F 17/30997 |
| 2006/0212318 A1* | 9/2006 | Dooley | G06Q 10/10 705/4 |
| 2006/0265641 A1 | 11/2006 | Garfinkle | |
| 2007/0143343 A1* | 6/2007 | Iverson | G06F 17/3089 |
| 2007/0233549 A1 | 10/2007 | Watson | |
| 2007/0288888 A1* | 12/2007 | Gentry | G06F 8/10 717/106 |
| 2008/0010492 A1* | 1/2008 | Thompson | G06F 11/328 714/4.4 |
| 2008/0126394 A1* | 5/2008 | Jain | G06Q 10/06311 |
| 2008/0148157 A1 | 6/2008 | Kamdar | |
| 2008/0278740 A1 | 11/2008 | Bird | |
| 2009/0049011 A1 | 2/2009 | Mock | |
| 2009/0248441 A1* | 10/2009 | Okada | G06F 19/321 705/2 |
| 2010/0002685 A1* | 1/2010 | Shaham | H04M 3/002 370/352 |
| 2010/0172576 A1* | 7/2010 | Goldfarb | G06T 7/11 382/164 |
| 2011/0055705 A1 | 3/2011 | Firminger | |
| 2011/0093453 A1* | 4/2011 | Frayman | G06Q 50/18 707/723 |

OTHER PUBLICATIONS

Unknown Author, Oracle Business Intelligence, New Features Guide Release 10.1.3.3. Part No. E10416-04, Apr. 2008, 18 pages.

* cited by examiner

SQL Monitoring Report

SQL Text create index cust_first_name_idx on customers2(CUST_FIRST_NAME) parallel 3

Global Information

| | |
|---|---|
| Status | :DONE |
| Instance ID | :1 |
| Session | :SH (512:40282) |
| SQL ID | :7f1qr8sztm868 |
| SQL Execution ID | :16777216 |
| Execution Started | :10/16/2009 14:49:20 |
| First Refresh Time | :10/16/2009 14:49:21 |
| Last Refresh Time | :10/16/2009 14:51:02 |
| Duration | :102s |
| Module/Action | :SQL *Plus/- |
| Service | :SYS$USERS |
| Program | :@stach01 (TNS V1-V3) |

—120

Global Stats —130

| Elapsed Time(s) | Cpu Time(s) | IO Waits(s) | Application Waits(s) | Concurrency Waits(s) | Cluster Waits(s) | Other Waits(s) | Buffer Gets | Read Reqs | Read Bytes | Write Reqs | Write Bytes |
|---|---|---|---|---|---|---|---|---|---|---|---|
| 224 | 43 | 179 | 0.00 | 0.55 | 0.00 | 0.29 | 91749 | 104K | 1GB | 23224 | 1GB |

Parallel Execution Details (DOP=3, Servers Allocated=6) —140

| Name | Type | Server# | Elapsed Time(s) | Cpu Time(s) | IO Waits(s) | Application Waits(s) | Concurrency Waits(s) | Cluster Waits(s) | Other Waits(s) | Buffer Gets | Read Reqs | Read Bytes | Write Reqs | Write Bytes | Wait Events (sample #) |
|---|---|---|---|---|---|---|---|---|---|---|---|---|---|---|---|
| PX Coordinator | QC | | 0.88 | 0.04 | | 0.03 | | | 0.31 | 1404 | 10 | 81920 | | | os thread startup (1) |
| p000 | Set 1 | 1 | 86 | 16 | 70 | | | | 0.50 | 0.02 | 18010 | 44854 | 362MB | 10403 | 468MB | direct path read temp (39) direct path write (9) direct path write temp (27) |
| p001 | Set 1 | 2 | 27 | 5.28 | 22 | | | 0.01 | 0.24 | | 7495 | 11910 | 97MB | 3075 | 135MB | direct path read temp (15) direct path write (2) direct path write temp (4) |
| p002 | Set 1 | 3 | 81 | 15 | 66 | | | 0.02 | 0.01 | 0.02 | 16994 | 41743 | 337MB | 9746 | 436MB | reliable message (1) direct path read temp (32) direct path write (9) direct path write temp (23) |
| p003 | Set 2 | 1 | 10 | 2.54 | 7.04 | | | | 0.00 | | 15945 | 1943 | 117MB | | | direct path read (4) |
| p004 | Set 2 | 2 | 9.47 | 2.51 | 6.95 | | | | 0.01 | | 15953 | 1944 | 117MB | | | direct path read (5) |
| p005 | Set 2 | 3 | 10 | 2.60 | 7.03 | | | | 0.01 | | 15948 | 1940 | 117MB | | | direct path read (5) |

FIGURE 1A
Prior Art

| Figure 1A |
|---|
| Figure 1B |

FIGURE 1

SQL Plan Monitoring Details (Plan Hash Value=2502832648) — 150

| Id | Operation | Name | Rows (Estim) | Cost | Time Active(s) | Start Active | Execs | Rows (Actual) | Read Reqs | Read Bytes | Write Reqs | Write Bytes | Mem (Max) | Temp (Max) | Activity (%) | Activity Detail (# samples) |
|----|-----------|------|--------------|------|----------------|--------------|-------|---------------|-----------|------------|------------|-------------|-----------|------------|--------------|-----------------------------|
| 0 | CREATE INDEX STATEMENT | | | | 1 | +102 | 7 | 3 | | | | | | | | |
| 1 | PX COORDINATOR | | | | 102 | +1 | 7 | 3 | | | | | | | 0.47 | os thread startup (1) |
| 2 | PX SEND QC (ORDER) | :TQ10001 | 6M | | 49 | +53 | 3 | 3 | | | | | | | | |
| 3 | INDEX BUILD NON UNIQUE | CUST_FIRST_NAME_IDX | | | 61 | +41 | 3 | | | | 8028 | 243MB | | | 13.27 | Cpu (7) reliable message (1) direct path write (20) |
| 4 | SORT CREATE INDEX | | 6M | | 100 | +2 | 3 | 12M | 98507 | 795MB | 15196 | 795MB | 8M | 336M | 76.30 | Cpu (21) direct path read temp (86) direct path write temp (54) |
| 5 | PX RECEIVE | | 6M | 4513 | 28 | +3 | 3 | 12M | | | | | | | 0.95 | Cpu (2) |
| 6 | PX SEND RANGE | :TQ10000 | 6M | 4513 | 27 | +3 | 3 | 12M | | | | | | | 1.42 | Cpu (3) |
| 7 | PX BLOCK ITERATOR | | 6M | 4513 | 27 | +3 | 6 | 12M | | | | | | | | |
| 8 | INDEX FAST FULL SCAN | CUST_NAME_IDX | 6M | 4513 | 27 | +3 | 42 | 12M | 5827 | 351MB | | | | | 7.58 | Cpu (2) direct path read (14) |

Prior Art

GENERATING AND DISPLAYING ACTIVE REPORTS

CLAIM OF PRIORITY

This application is a continuation of U.S. patent application Ser. No. 12/701,380, entitled "GENERATING AND DISPLAYING ACTIVE REPORTS", filed on Feb. 5, 2010, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention pertains generally to data processing and display, and relates more particularly to generating and displaying active reports.

BACKGROUND OF THE INVENTION

Effective and efficient data management is an important objective for modern business enterprises and other organizations. A key aspect of data management is providing a variety of users with access to widely distributed sources of enterprise data. One strategy for providing this access is to develop a set of data reporting tools that present data to multiple sets of users based on their specific usability requirements.

In one example, enterprise users involved in Information Technology (IT) system management must monitor and perform analysis on large amounts of system performance data being collected from the IT system platform. Much of this data is collected and stored so that analyses can be performed to identify current as well as historical system performance trends. Providing access to clear and complete data reports improves the quality of the analyses. Distributing data reports to users at different locations within the organization provides more efficient collaboration and improved user productivity.

System data from an IT infrastructure may be collected and presented to users in stand-alone data reports. Examples of collected system data reports include diagnostic data reports, performance tuning data reports, and real time application testing data reports. Stand-alone reports may be accessed by users who are connected to the data storage and receive live updates of the systems data and/or accessed by users (such as tech support personnel and application developers) who are not connected to the data storage and cannot receive live updates of the data. Additionally, stand-alone reports may be used to complement system data being collected in real time by system administration software applications, because stand-alone reports enable access to system data which are often transient, such as quality assurance (QA) runs, in-memory performance data, and system workload statistics.

Typically, stand-alone data reports are formatted for display as plain text or formatted as a static Hypertext Markup Language (HTML) document. A stand-alone data report having this type of formatting may then be transmitted to a user and rendered for display within a web browser, text application, or other application that is local to the user without requiring additional specialized software. FIGS. 1A and 1B depict a screen shot of a browser view of an exemplary prior art data report that represents data collected during execution of a create index SQL statement. The report has been formatted as a static HTML document for display as a set of tables representing overall parameters of the execution event 120, global statistics of system performance activity 130, parallel execution details 140 (this query was executed on a grid IT platform), and SQL plan execution details 150.

Despite providing more display features than a plain text format, a data report formatted as an HTML document has limitations. HTML does not include built-in support for graphics (such as charts and interactive Graphical User Interface (GUI) widgets), so a data report formatted as a single HTML document typically is displayed as a single static page in like manner to FIG. 1. This type of display has usability limitations, such as being difficult for a user to discover data trends or to interact with the display in order to view related information about selected subsets of the report data. Adding features, such as an interactive interface, that improve the usability of a static HTML document by making it an active report typically requires explicitly incorporating additional non-HTML entities such as images, scripts, or graphics code such as an Adobe Flash Small Web Format (SWF) file. These incorporated entities must either be available locally, embedded in the HTML file, or provided along with the HTML file as additional files and directories in order to display the additional features when the document is rendered. The additional non-HTML entities associated with an HTML file may increase the size of data to be transported, limiting the portability of the file. Additional local configuration requirements for users viewing a file may limit accessibility of the file.

In addition, the same set of collected data may be accessed in real time by a user via the interactive GUI of a Rich Internet Application (RIA), as well as be accessed via a static display of a stand-alone data report. A user accessing the same set of collected data may be required to learn both display presentation formats since the look and feel of the two display presentations are different. This user knowledge requirement limits user productivity and adds resource cost to an enterprise system.

SUMMARY OF THE INVENTION

Embodiments of the present invention enable the generation and display of active reports. Applications of the present invention include its use in embodiments of a web-based product for managing an Information Technology (IT) infrastructure although the present invention is not limited to such applications. In embodiments, an active report is an active report file comprising report data and a user interface (UI) reference to a network location of code that defines an interactive UI comprising graphical user interface (GUI) components to be rendered when displaying the report data. In embodiments, the UI reference may be a link designating a location of the UI code on a network, such as the Internet, an intranet or an extranet.

In embodiments, the interactive UI of the active report is the same or similar to an interactive UI available in rich internet applications (RIAs). This allows a user who does not have access to the RIA to view and interact with the report data in an interactive UI that provides the same or similar interactive report functionality as the UI provided in the RIA. In alternative embodiments, the interactive UI provided to a user viewing an active report may be different from the interactive UI provided to users of the RIA. In embodiments, the active report may be shared with a non-accessor of the native application that generated the report by sending the report via email; or alternatively, a non-accessor may access the report from a shared file location.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIGS. 1A and 1B depict a screen shot of a browser view of an exemplary prior art data report.

DETAILED DESCRIPTION OF THE PREFERRED EMBODIMENTS

Figure 2:
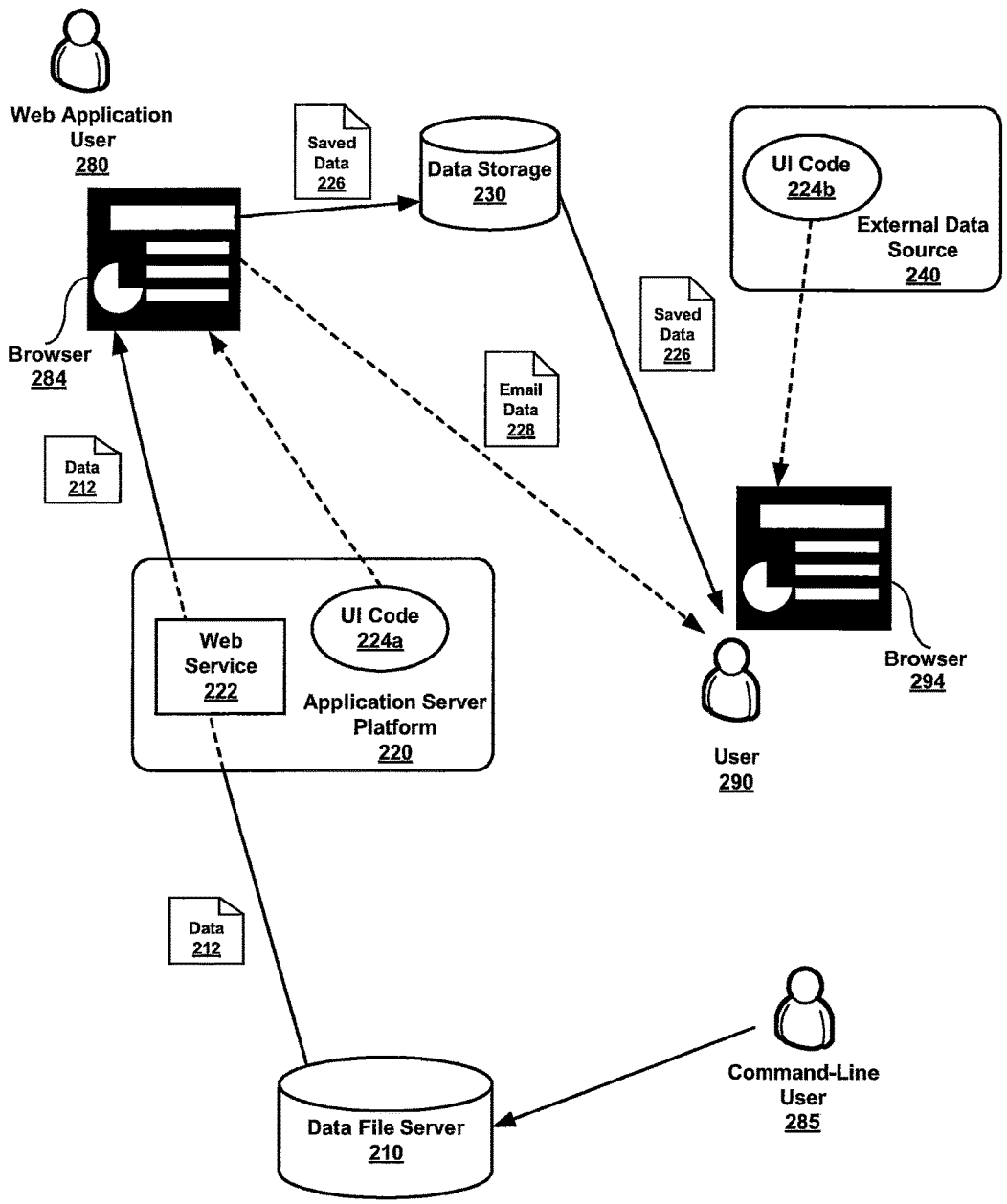
FIG. 2 depicts an exemplary scenario for generating and displaying an active report according to various embodiments of the invention.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, including software, hardware, or firmware, or combinations thereof. Accordingly, the figures described herein are illustrative of specific embodiments of the invention and are meant to avoid obscuring the invention.

Components, or modules, shown in block diagrams are illustrative of exemplary embodiments of the invention and are meant to avoid obscuring the invention. It shall also be understood throughout this discussion that components may be described as separate functional units, which may comprise sub-units, but those skilled in the art will recognize that various components, or portions thereof, may be divided into separate components or may be integrated together, including integrated within a single system or component.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The use of the phrases "in one embodiment," "in an embodiment," or "in embodiments" in various places in the specification are not necessarily all referring to the same embodiment or embodiments.

The use of certain terms in various places in the specification is for illustration and should not be construed as limiting. Usage of the term "service" is not limited to describing a single function; usage of the term also may refer to a grouping of related functions or functionality. Similarly, usage of the term "resource" is not limited to describing a single resource; the term also may be used to refer to a set of resources that may either be distributed or aggregated within a computing environment.

A. Active Reports

The present invention provides an active report that may be used, for example, in a web-based product for managing an Information Technology (IT) infrastructure, such as Enterprise Manager Grid Control by Oracle International Corporation of Redwood Shores, Calif. The examples discussed below are for illustrative purposes only and not intended to limit the invention to these examples. Those skilled in the art will recognize the general applicability of the present invention.

In embodiments of the present invention, an enterprise application framework may support system administration applications which are rich internet applications (RIAs) that provide users, such as subscribers or licensees, with real-time access to IT system data. As is well known to those skilled in the art, rich internet applications (RIAs) are web applications having rich interactive user interfaces (UIs) that provide functionality and performance characteristics on a web client that are similar to the characteristics of UIs found in desktop applications. A rich interactive UI typically is displayed as a graphical user interface (GUI) that has sophisticated graphics features including, for example, charts, images, animation, and GUI components (e.g. widgets) such as drop-down menus, sliders, buttons, and dynamic pop-up windows.

The UI of an RIA is defined by a set of software components within the presentation tier of a rich internet application framework (an RIA framework) that are rendered locally on a web client. In addition to the UI software components, an RIA framework also includes software components for delivering the RIA application UI to a web client as well as for interfacing the UI with other application components deployed into the RIA framework. Examples of RIA frameworks include Adobe Flash/Adobe Flex/AIR, Java/JavaFX, Mozilla XUL and Microsoft Silverlight.

In embodiments of the invention, an active report file enables a user receiving the file at a location disconnected from an RIA framework to view the report data within the file using the same rich interactive UI as displayed on a web client of an executing RIA. Thus, in embodiments, a user who does not have access to that functionality, such as a non-subscriber or non-licensee, is able to view and interact with the report data via a UI having the same look and feel as the RIA UI without requiring the user to either access the RIA framework or to locally install additional software, assuming that the non-accessor has software to render the UI, which is typically readily available.

FIG. 2 depicts an exemplary scenario, presented for illustration and not for limitation, for generating and displaying an active report file according to the present invention. In embodiments, data 212 may be retrieved from a data file server 210 or from an application server platform 220, processed within the application server platform 220, and provided by a web service 222 to a web application user's 280 web client browser 284. In embodiments, the retrieved data 212 may be further formatted as a structured extended markup language (XML) document. In embodiments, the RIA UI that is rendered by the user's local browser 284 (web client) is based on UI code 224a defining the UI and provided by the RIA framework on the application server platform 220. In embodiments, the RIA UI provides an interactive user interface that enables the data to be viewed using graphics and other features (e.g. tabbed views) that are not available in a static HTML file rendered and viewed in a browser.

One example of RIA UI code is an Adobe Flash Small Web Format (SWF) file. A SWF file defines a display sequence of graphics objects and images that may include animation and sound. An RIA UI defined by a SWF file is processed and rendered locally on a web application client by an Adobe Flash Player application. Those skilled in the art will recognize that a variety of RIA frameworks and UI code implementations exist, and that the RIA framework and UI code implementation choice is not critical to the invention.

In embodiments, a web application user 280 may issue a request to generate an active report file that includes an association of a set of data 212 and UI code 224a. In embodiments, an active report file may be an HTML file, although those skilled in the art will recognize that a variety of file formats exist and that the choice of file format is not critical to the invention. In embodiments, an active report file comprises a UI reference to the code to be rendered when the active report is viewed. In various embodiments, the UI reference may be a link (such as a Uniform Resource Identifier (URI)) to a location of the UI code 224b at an external data source 240 that is external to the active report file. For example, the URI may link to a server or other location on a network, such as the Internet, an intranet or an extranet, that stores the UI code.

One advantage of including a reference to the UI code in the active report, rather than including the UI code directly in the active report is improved portability of the active report file. For example, the UI code (e.g., SWF file) is typically a large file. Including the file in the active report would substantially increase the file size of the active report, making storage or transmission of the active report more difficult. Further, by including a reference to the UI code, the UI may be updated with new versions at the network location so that the most recent version of the UI is available to the user accessing the active report. Further, if there are multiple UI code implementations available, the same active report may present a different UI to different groups of users. For example, the UI reference provided in an active report file accessible to corporate internal users may be different from the UI reference provided in the active report file accessible to external users. Further, since the UI and the corresponding data cannot be rendered in the active report without accessing the UI code from the network location, the provider of the UI code may limit or even block access to the interactive UI features for certain users. For example, the UI code may only be available for a day or two to provide a user with a demonstration or limited access time to the report data.

There are additional benefits for providing an interactive UI as opposed to static HTML/text reports. For example, one advantage of utilizing the same or similar UI for users and non-user/non-accessor is that the same information is shared in the same or similar presentation format, making it easier for the use and the non-user to discuss the data. Furthermore, a user, when viewing an active report using the non-accessor UI, does not need to learn two UIs to view and interact with the data. In addition, this also helps reduce development costs. And, it should be noted that having a single solution for both improves quality of development and quality for usage.

In embodiments, the UI code 224a may be located within the application server platform 220 that hosts the RIA application and/or be located at an external data source 240, such as a server on a network. In embodiments, the UI code 224a located within the application server platform 220 may be the same as the UI code 224b located at an external data source 240, or, in other embodiments, UI code 224a and UI code 224b may be different versions of the same UI code.

In embodiments, a user receiving an active report file views a locally rendered active report display of the data 212 using an interactive UI defined by the referenced UI code. In embodiments, the UI code 224b to be rendered in the local browser 294 of a user 290 who is disconnected from the application server platform 220 may be retrieved by accessing the UI code 224b from the location (e.g. a network location) specified by the UI reference extracted from the active report. In embodiments, user 290 is a non-accessor of the application running on the application server platform 220, but is provided the same or similar interactive display and reporting functionality available to an accessor of the application (e.g., web application user 280). In various embodiments, a user 290 may receive an active report file via email 228 and/or retrieve 226 a saved active report file from data storage 230 such as a file server or a database.

In embodiments, an active report file may be generated by a web application user 280 via interaction with an RIA UI displayed on a web client. In alternate embodiments, a user 285 who has command line access to a data file server 210, such as a database, may generate an active report file via a command line entry and/or via an application programming interface (API) using a programming language such as SQL. In embodiments, a generated active report file may be saved 226 in data storage 230 and/or be emailed 228 to another user.

Figure 3:
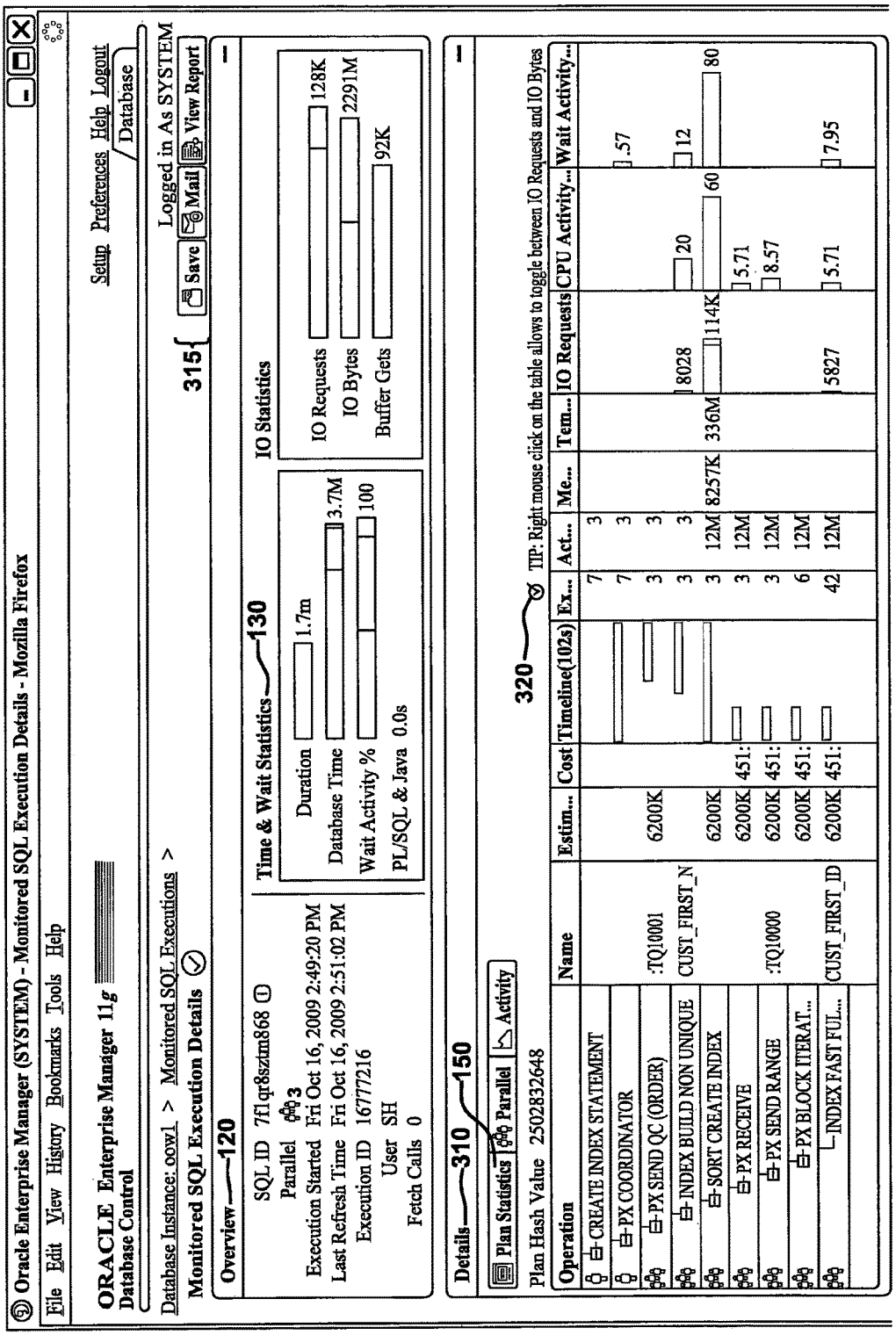
FIG. 3 depicts an exemplary RIA UI snapshot view in which the plan statistics tab has been selected according to various embodiments of the invention.
Figure 4:
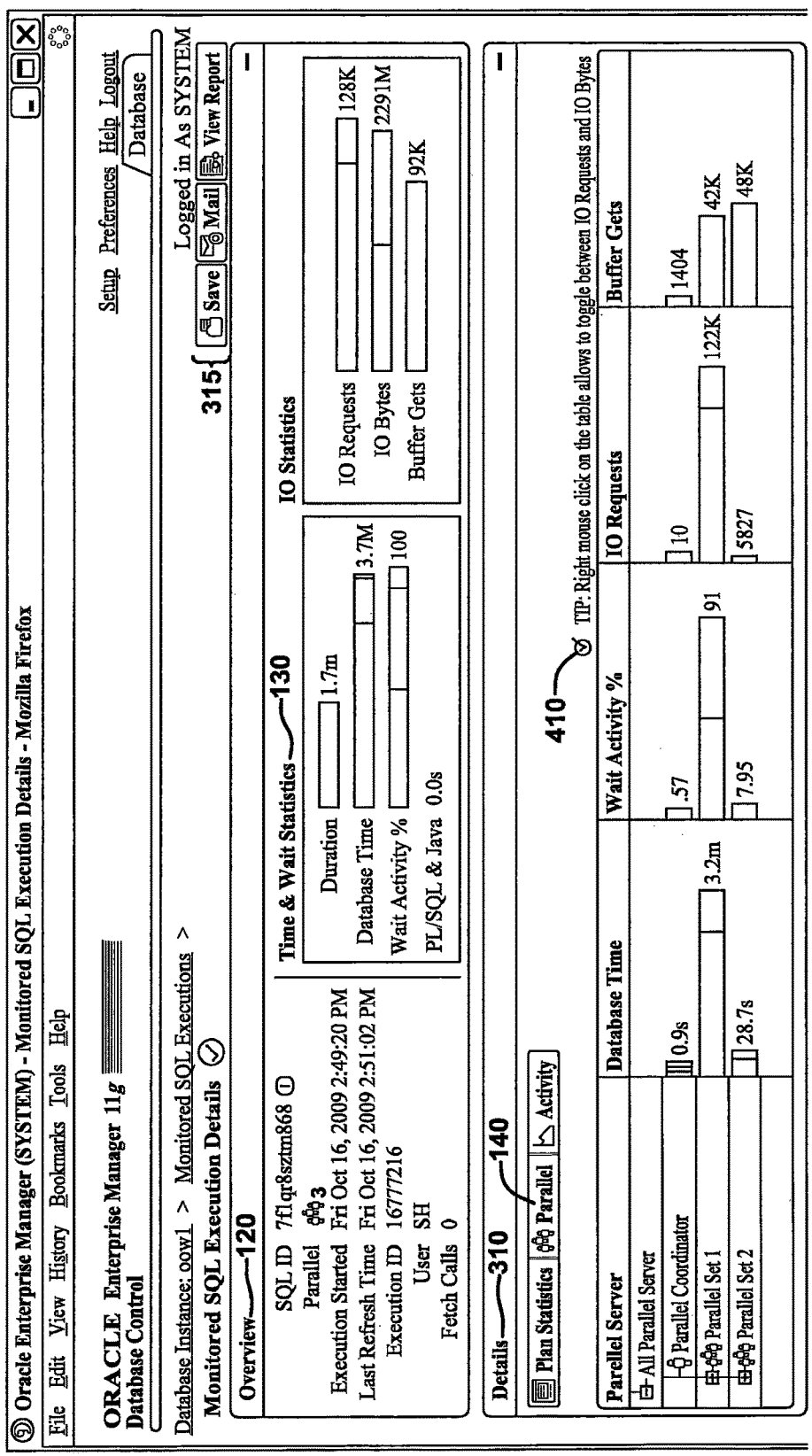
FIG. 4 depicts an exemplary RIA UI snapshot view in which the parallel tab has been selected according to various embodiments of the invention.
Figure 5:
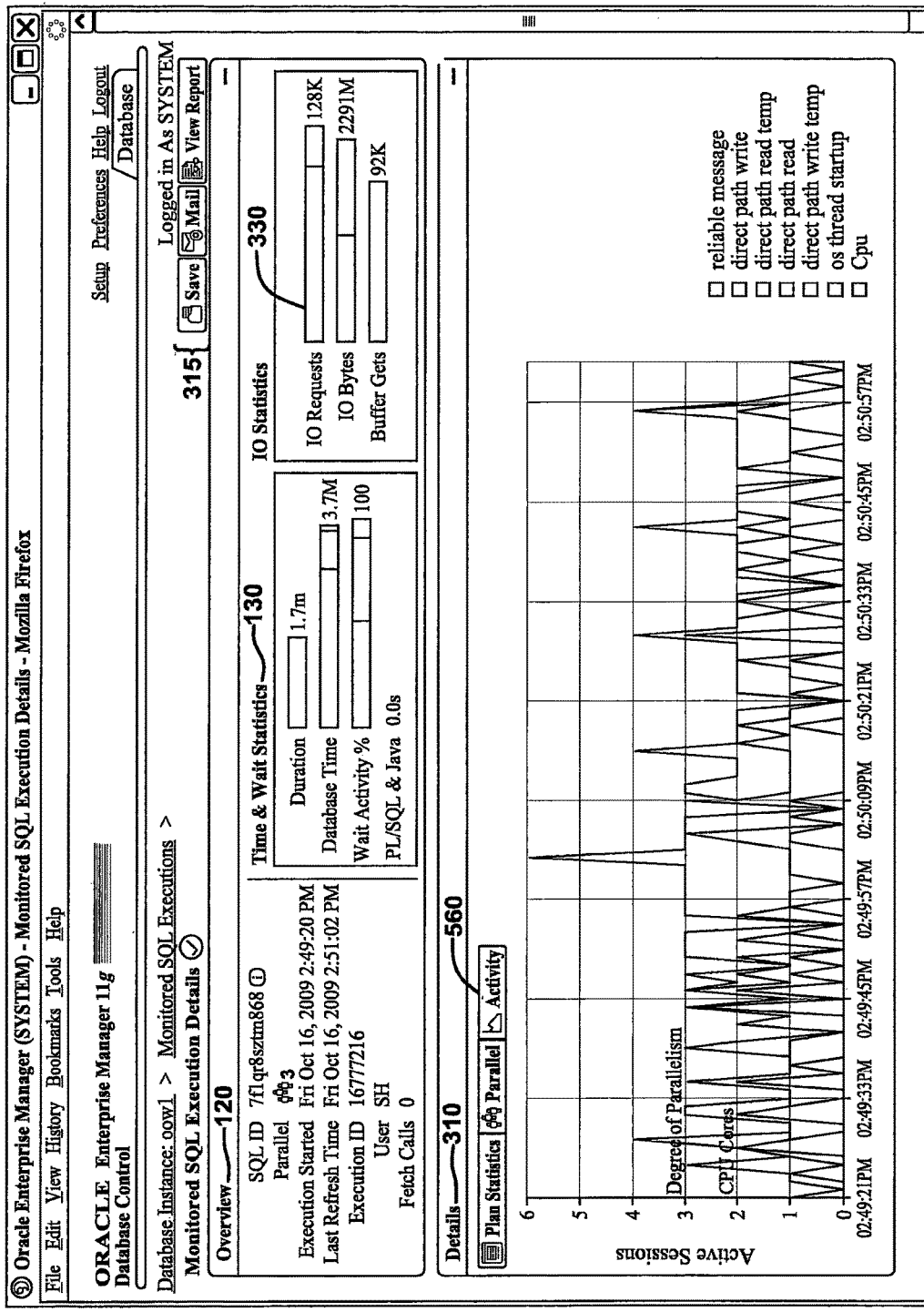
FIG. 5 depicts an exemplary RIA UI snapshot view in which the activity tab has been selected according to various embodiments of the invention.

FIGS. 3, 4, and 5 depict, for illustration and not for limitation, exemplary snapshots of real-time data from an RIA UI rendered in a web client browser 284. In this example, the RIA displays real-time system data as it is collected during the execution of a create index SQL statement. The RIA UI view being rendered in the browser consists of an Overview frame, representing overall parameters of the execution event 120, global statistics of the system performance activity 130, and a Details frame 310 showing overall performance data of all the executions of a SQL statement for a period of time. The Details frame 310 contains three tabbed data frames, each of which can be selected for viewing a different data display. The exemplary RIA UI is a rich interactive GUI that includes graphics features, such as widgets, that provide intuitive graphical representations of the data and enable a user to interact with the displayed data. For example, passing a selector (such as a mouse) over any of the statistics bars 330 will cause display of a dynamic popup window providing additional information about the statistic.

Each figure depicts a different view (or display screen) of one of the tabbed frames which a user may select within the Details frame 310. In FIG. 3, the plan statistics tab 150 has been selected and the SQL plan execution data subset is displayed in the frame. By selecting a mouse right button, the user may toggle 320 the data displayed in the table between 10 Requests and 10 Bytes. This is an example of the interactive nature of an RIA UI compared to a static HTML UI as described with respect to FIG. 1.

In FIG. 4, the parallel tab 140 has been selected and the parallel execution data subset is displayed. As in the plan statistics tab view of FIG. 3, the user may toggle 410 the data displayed in the table between 10 Requests and 10 Bytes by selecting a mouse right button. In FIG. 5, the activity tab 560 has been selected and the system performance activity data subset is displayed in graphical form. The graph is updated in real-time during the execution event from a database 210 and/or cached system data, and will display a summary of execution behavior of the event over time. This data is not displayed in the static HTML report of FIG. 1.

In embodiments, the interactive UI of the RIA may be defined by UI code provided by the application server platform 220. For example, in one embodiment, the UI code may comprise an Adobe Flash Small Web Format (SWF) file. In embodiments, the UI code is provided to the user's web client browser 284 from the application server platform 220, and the defined UI is locally rendered along with the report data in the user's browser 284. For example, if the UI code comprises a SWF file, the UI and the report data are rendered for display within the user's browser by an Adobe Flash player installed in the browser 284. Those skilled in the art will recognize that a variety of UI code implementations exist, and that the UI code implementation and display rendering choices are not critical to the invention.

In embodiments of the invention, web application user 280 may initiate a request to generate an active report of the data by selecting one of the buttons 315 displayed in the RIA UI. In embodiments, the generated report saves a snapshot of the data being collected at the instant the report is generated. By selection of one of the buttons 315, the web application user 280 may initiate requests to save 226 or email 228 the generated active report, respectively. In other embodiments, a request for the generation of an active report may be initiated from a command line interface to a data source 210, as previously discussed. Thus, in embodiments, a user 285 who does not have access to the application server platform 220 and the real-time RIA UI may request the generation of an active report file, and, additionally, may use a command line interface to save and/or email an active report.

Figure 6:
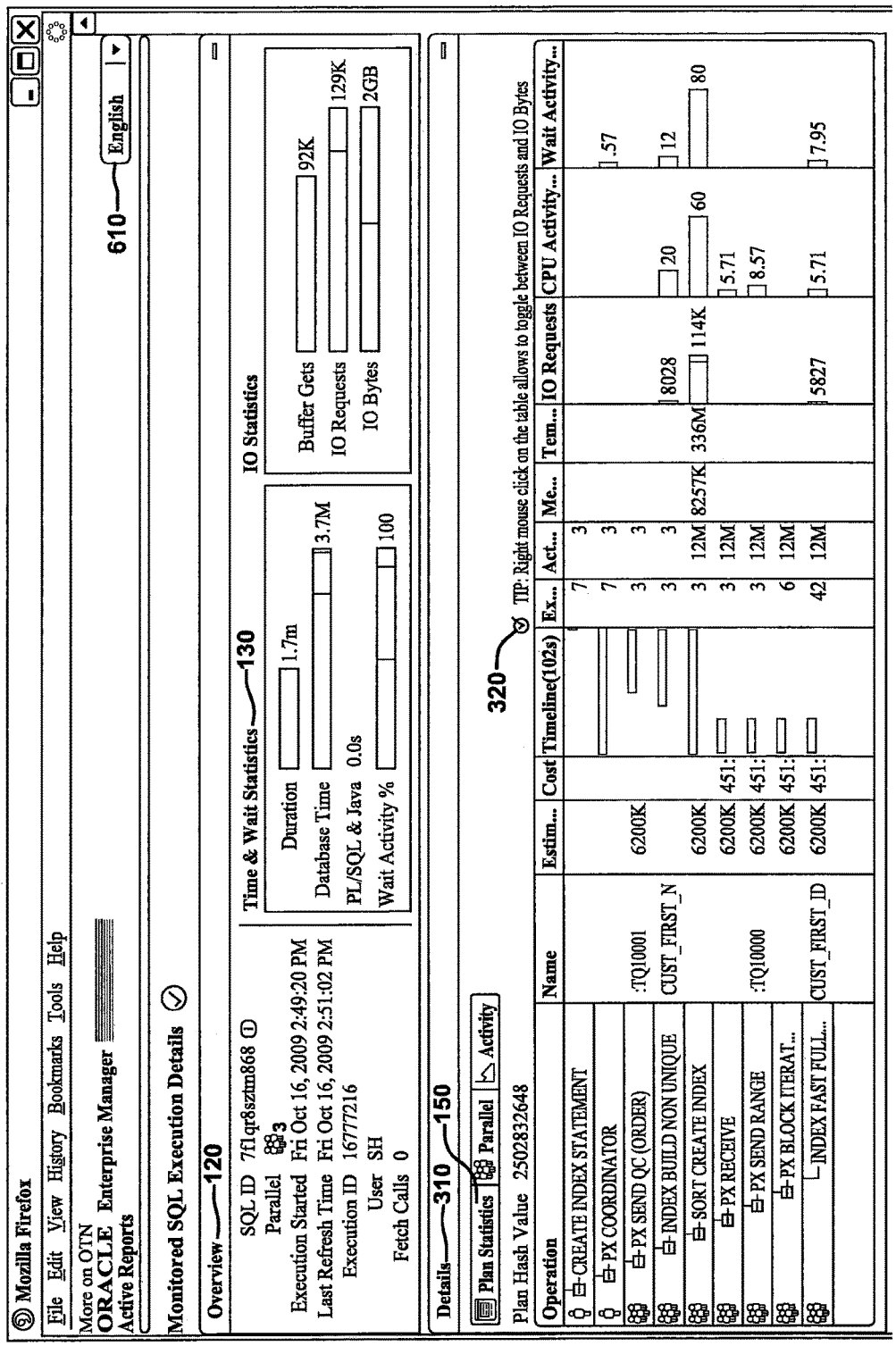
FIG. 6 depicts an exemplary active report UI snapshot view in which the plan statistics tab has been selected according to various embodiments of the invention.
Figure 7:
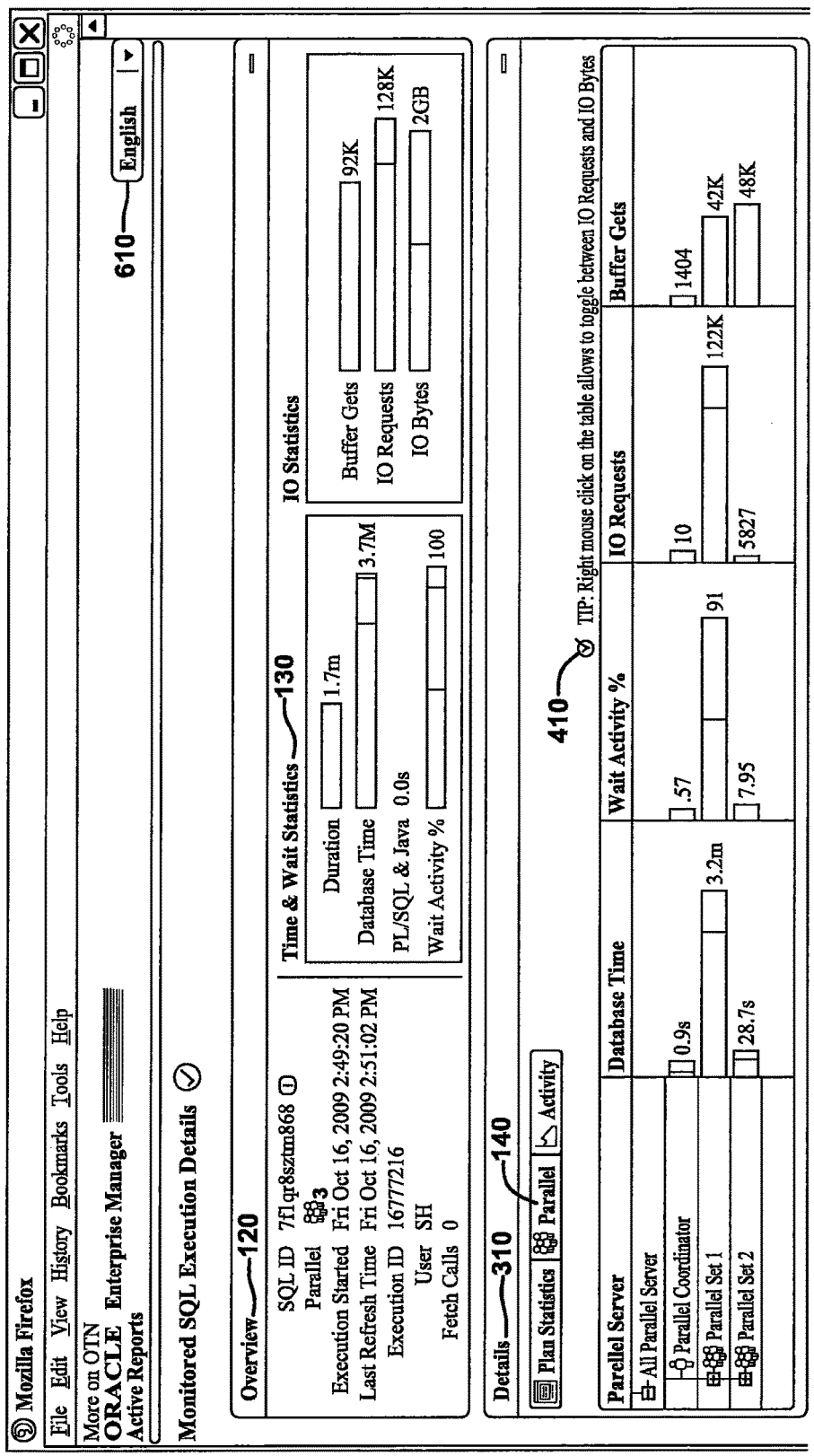
FIG. 7 depicts an exemplary active report UI snapshot view in which the parallel tab has been selected according to various embodiments of the invention.
Figure 8:
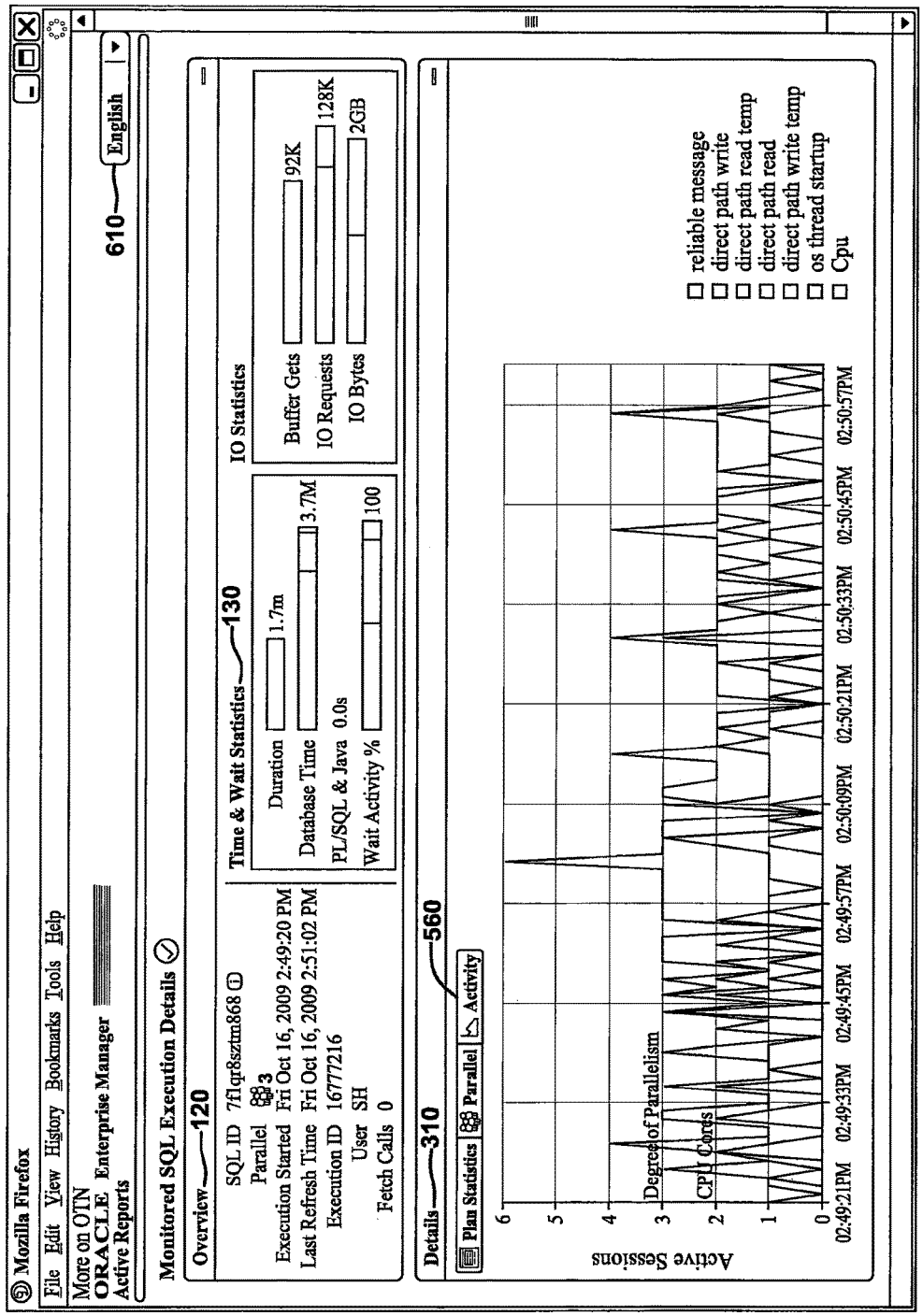
FIG. 8 depicts an exemplary active report UI snapshot view in which the activity tab has been selected according to various embodiments of the invention.

FIGS. 6, 7, and 8 illustrate views of an exemplary active report rendered and displayed in a browser according to various embodiments of the invention. The active report represents a snapshot of the data collected at the time the report was generated during the execution of a create index SQL statement, and is analogous to the exemplary real-time data displayed in FIGS. 3, 4, and 5. As shown in FIGS. 6, 7, and 8, the active report provides an interactive display of the data that has the same or similar look and feel as the real-time RIA UI display of the data shown in FIGS. 3, 4, and 5, including the sophisticated graphics features such as widgets. This is in contrast to the UI displayed for the static HTML report of data collected from execution of a create index SQL statement shown in FIG. 1, which simply displays the data in tabular form.

Like the real-time RIA UI, the active report UI display view contains an Overview frame 120 and a Details frame 310 containing three tabbed data subset frames, each of which can be viewed by selection of its respective tab. In embodiments, an active report UI may include report-specific UI components (e.g. text and/or graphics features) not found within the real-time RIA UI of FIGS. 3, 4, and 5. For example, the active report UI in FIGS. 6, 7, and 8 includes a drop-down menu selection widget 610 providing the user viewing the report with a choice of the report language used in the display. In embodiments, the active report UI does not contain the buttons 315 for generating, emailing, or storing an active report file that are displayed in the real-time RIA UI, since these functions are not relevant to the display of an active report.

In like manner to FIGS. 3, 4, and 5, FIGS. 6, 7, and 8 each depict a different view of one of the tabbed frames which a user may select within the Details frame 310. FIG. 6 illustrates an analogous view to FIG. 3, showing the plan statistics tab 150. Like the RIA UI, the active report user may toggle 320 the data displayed in the table between 10 Requests and 10 Bytes by selecting a mouse right button. FIG. 7 illustrates an analogous view to FIG. 4, showing the parallel tab 140. Like the RIA UI, the active report user may toggle 410 the data displayed in the table between 10 Requests and 10 Bytes by selecting a mouse right button. FIG. 8 illustrates an analogous view to FIG. 5, showing the performance activity tab 560. Because the active report represents a snapshot of collected data, the active report activity graph simply summarizes the set of activity data collected during the execution event up to the time that the report was generated and does not update in real time like the graph represented in FIG. 5.

Figure 9:
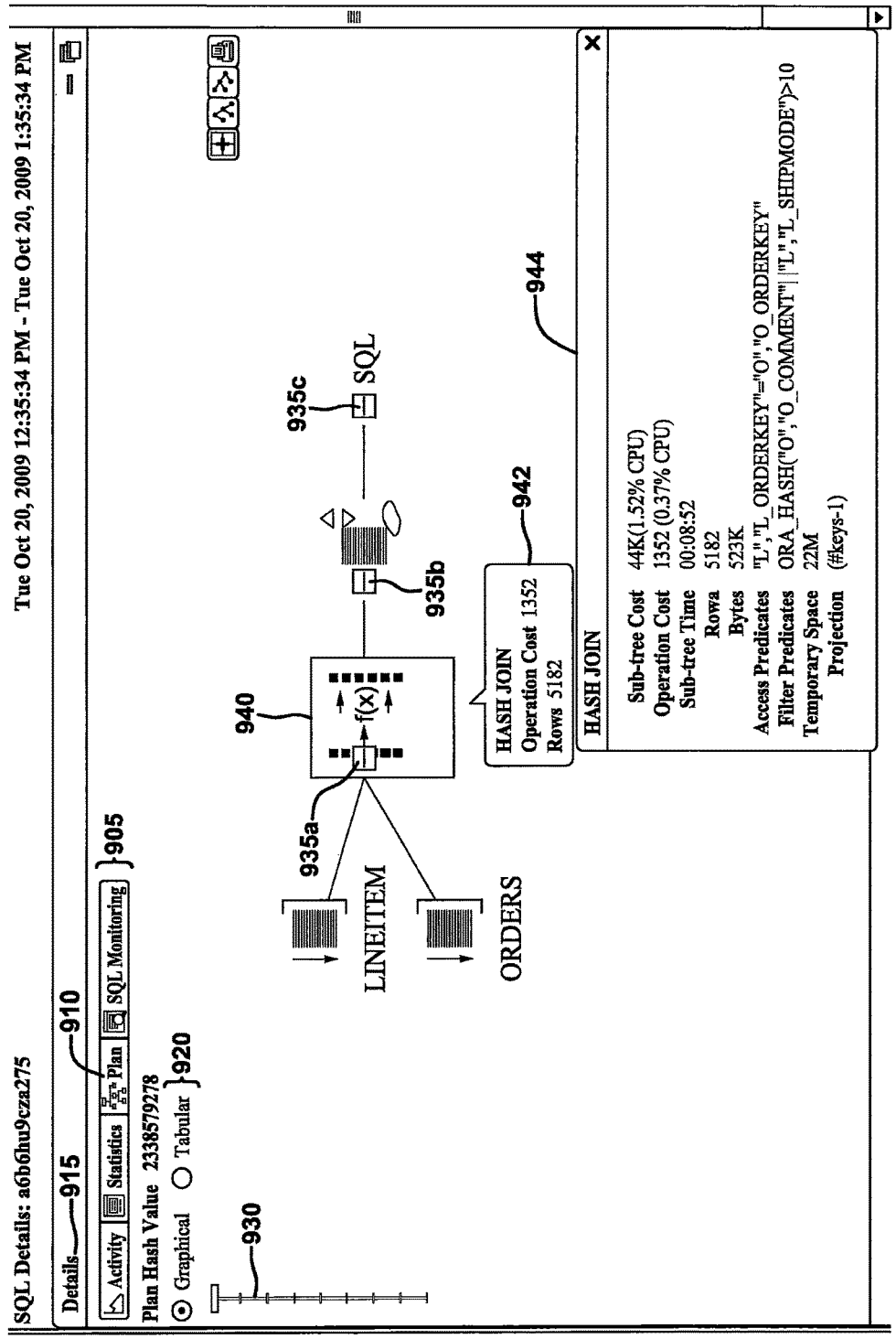
FIG. 9 depicts an exemplary active report UI snapshot view depicting details about a SQL statement according to various embodiments of the invention.

FIG. 9 is another example screen shot of an active report that shows exemplary interactive features, presented for illustration and not limitation, which may be rendered in an active report UI according to embodiments of the invention. This exemplary active report UI comprises multiple tabbed views showing details about an SQL statement, each of which may be viewed in response to a user selecting one of the displayed tabs 905. The active report user may select a display of either a graphical or tabular view of the report data by choosing a radio button 920; the graphical display has been selected in this example. The active report user may adjust the size of the graphical display by selecting the position of a slider bar 930 at the edge of the display.

FIG. 9 shows a graphical view, displayed in response to a user's selection of the Plan tab 910, of SQL execution plan details from a hash join query. In this example, the display screen shows a set of icons representing the query statement. Three of the icons display a "–" box (935*a*, 935*b*, 935*c*) to indicate that the icon is fully expanded. The icons displaying the boxes may be aggregated in response to a user selection of any box adjacent to an icon; when an icon represents a set of aggregated icons, the box adjacent to the icon displays a "+".

A user may display related information about the entities within the SQL execution plan by selecting any of the icons in the display. In the illustration, the user has selected the hash join icon 940. The icon is highlighted, indicating that it is selected, and two dynamic popup windows are displayed which provide additional information that identifies the selected icon 942 and additional details related to the icon 944.

B. Active Report Generation System

Figure 10A:
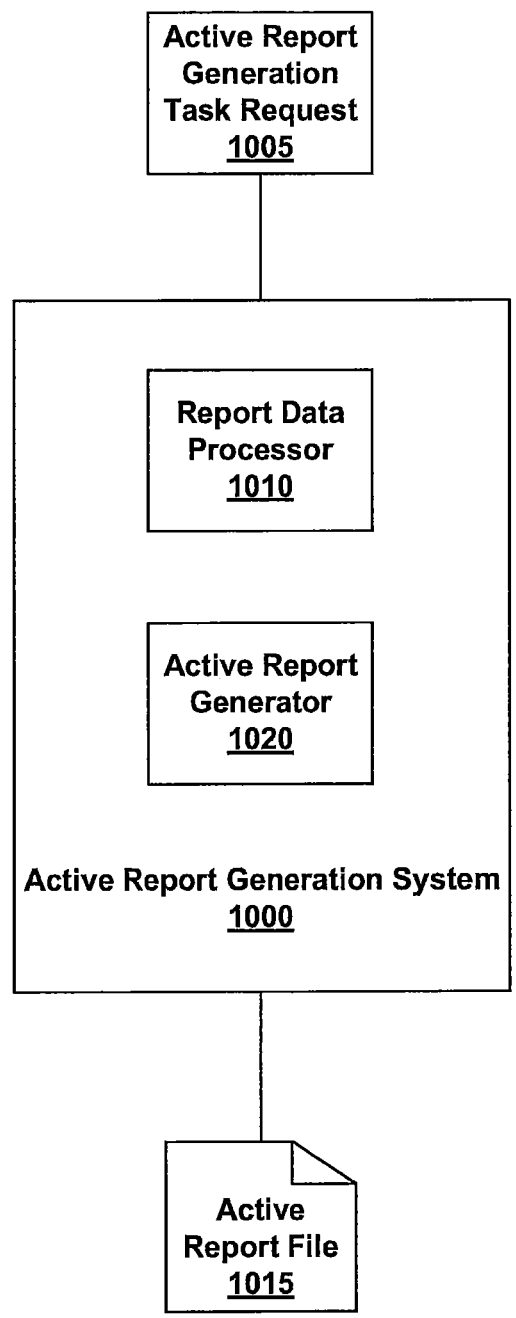
FIG. 10A is a block diagram of an embodiment of an active report generation system according to various embodiments of the invention.

FIG. 10A is a block diagram of an active report generation system 1000 for generating an active report file 1015 in response to receiving a request 1005 to generate an active report according to embodiments of the invention. In embodiments, the active report generation system 1000 may be part of an application that performs system monitoring, such as, for example, real-time database monitoring. In embodiments, the application displays real-time data in an interactive user interface. Active report generation system 1000 comprises report data processor 1010 and active report generator 1020. In embodiments, a request 1005 to generate an active report may be received by active report generation system 1000 at an application programming interface (API), a web service interface, and/or a command language interface, although those skilled in the art will recognize that the implementation choice for an active report generation system 1000 is not critical to the invention.

In embodiments, report data processor 1010 generates report data in response to receiving an active report generation task request 1005. In embodiments, the report data is data retrieved from data storage, such as a data file server 210 or database, which may represent real-time data at a particular point in time. In embodiments, the received report data may be organized and formatted into a data report such as a structured document (e.g. an XML document).

In embodiments, active report generator 1020 generates an active report file. In embodiments, the active report file comprises the report data and a reference to the UI code to be rendered when the active report is displayed. As previously discussed, the UI code may define an interactive UI comprising one or more GUI components. In various embodiments, the UI reference may be a link (such as a Uniform Resource Identifier (URI)) to a UI code location that is external to the active report file, as previously described. For example, the URI may be a universal resource locator (URL) that points to a server located on a network, such as the Internet, an intranet or an extranet, that stores UI code.

In embodiments, the active report generation task request 1005 may identify one or more sets of report data to be retrieved. In embodiments, the set of retrieved report data may correspond to a subset of the data available for display by an RIA UI, but be a superset of the data displayed by the RIA UI. For example, the set of report data for an SQL Monitoring report (see FIGS. 6-8) may be a different subset of available data from the set of report data for an SQL details report (see FIG. 9).

Figure 10B:
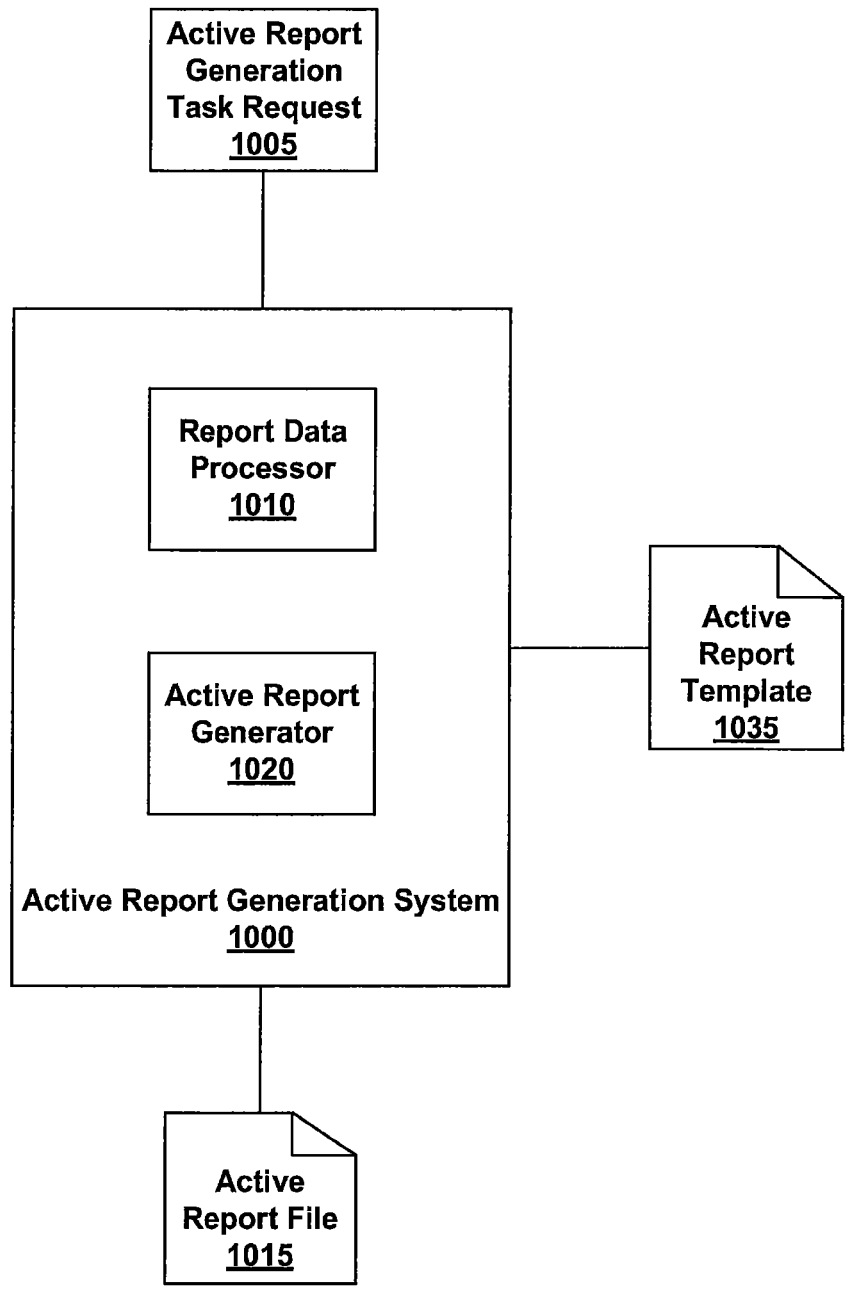
FIG. 10B is a block diagram of another embodiment of the active report generation system according to various embodiments of the invention.
Figure 11:
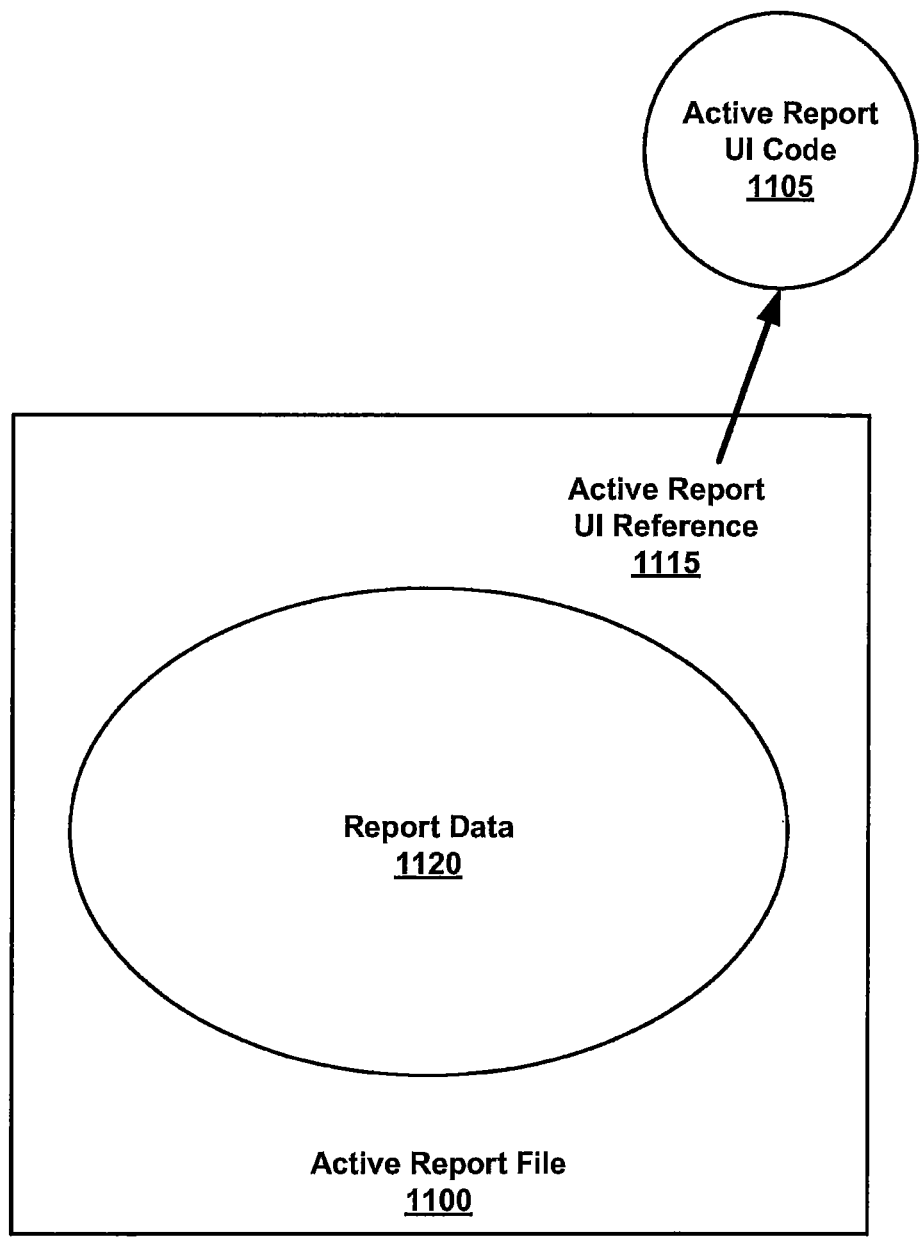
FIG. 11 is an illustration of an active report file structure according to various embodiments of the invention.

FIG. 10B depicts an alternative embodiment of active report generation system 1000 in which the active report file 1015 may be created by configuring an active report file template 1035. In embodiments, the active report file template 1035 is a single structured document, such as an HTML document, which may be configured to include retrieved report data and an associated UI reference. Using a template to generate an active report file improves efficiency because the resource cost of formatting each generated active report is removed. In embodiments, an active report file template 1035 may correspond to a type of report data or data report. For example, the SQL Monitoring active report in FIGS. 6, 7, and 8 may be generated by configuring a SQL Monitoring active report template. In embodiments, a software development kit (SDK) may be used to create one or more active report templates 1035. FIG. 11 illustrates a visual representation of an active report file 1100, formatted as a single structured document, which includes report data 1120 and a UI reference 1115 to UI code 1105.

C. Active Report Display System

Figure 12:
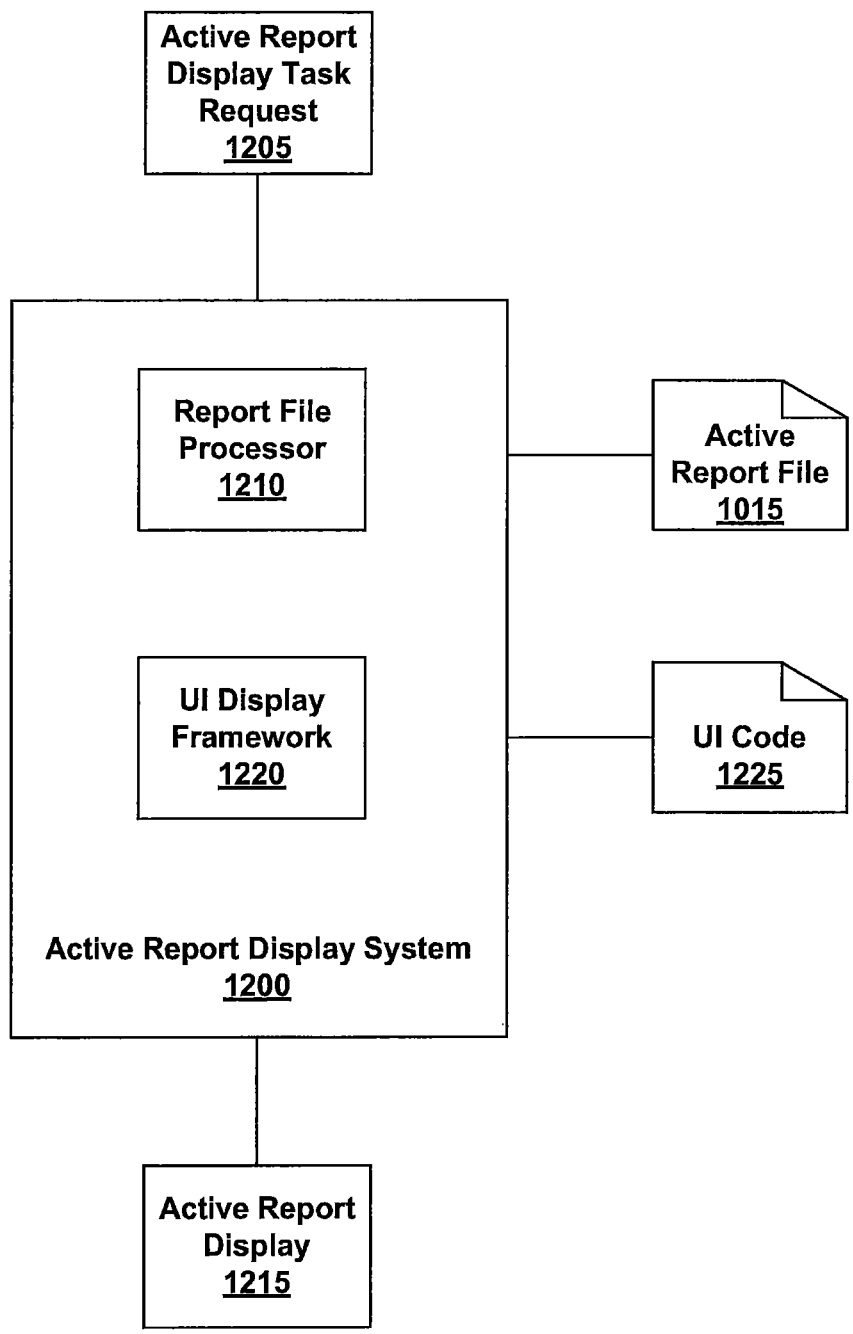
FIG. 12 is a block diagram of an active report display system according to various embodiments of the invention.

FIG. 12 is a block diagram of an active report display system 1200 for generating an active report display 1215 in response to receiving an active report display request 1205 according to various embodiments of the invention. Active report display system 1200 comprises report file processor 1210 and UI display framework 1220. In embodiments, active report display system 1200 may be executed on an application client or web client by a web browser, web browser plugin, and/or within execution environments such as sandboxes and virtual machines, and may comprise a UI rendering component such as an Adobe Flash player. Those skilled in the art will recognize that a variety of application client display execution environments exist, and that the implementation choice of an execution environment is not critical to the invention.

In embodiments, report file processor 1210 extracts report data and a UI reference from an active report file 1015 in response to receiving an active report display task request 1205. In embodiments, the UI reference may be a link, such as a URI, designating the location of the UI code 1225 that defines the UI, and report file processor 1210 retrieves the UI code 1225 from the location identified by the URI. As previously discussed, the link may designate a network location that is remote from the report file processor 1210 execution platform, and the UI code 1225 may be retrieved from the remote location via a network connection.

In embodiments, UI display framework 1220 generates an active report display 1215 by rendering the extracted report data and an interactive UI defined by the retrieved UI code on a display. In embodiments, the UI code may be the same as the UI code that defines the UI rendered on an application client for a rich internet application (RIA), such as a UI defined by an Adobe Flash SWF file and rendered by an Adobe Flash Player installed on the application client. For example, a user who does not have access to the RIA that provided the report data can still have interactive reporting functionality when viewing the active report by accessing the same or similar UI code used by the RIA application. In embodiments, the interactive UI may comprise multiple display screens, such as the active report UI designs illustrated in FIGS. 6, 7, 8, and 9. Those skilled in the art will recognize that a particular UI design choice is not critical to the invention.

D. Methods for Generating an Active Report

Figure 13:
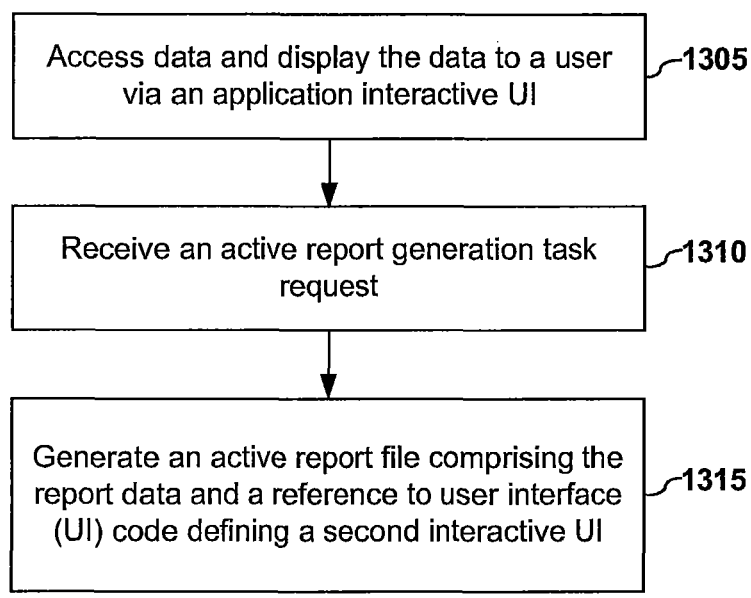
FIG. 13 depicts a method for generating an active report according to various embodiments of the invention.

FIG. 13 depicts a method 1300 for generating an active report according to embodiments of the invention. In embodiments, method 1300 may be implemented in embodiments of active report generation system 1000.

In embodiments, data is accessed and displayed to a user of an application via an application interactive UI 1305. For example, in embodiments, a rich interactive application (RIA) accesses data in real-time from a data source, such as a database or other storage location, and displays the data to a user via an application interactive UI.

In embodiments, an active report generation task request is received 1310. In embodiments, an active report generation task request 1005 may be generated by the application user through the interactive UI of the RIA. In alternate embodiments, a user who has command line access to the data source may generate an active report generation task request 1005 via a command line entry and/or via an application programming interface (API) using a programming language such as SQL. In embodiments, the active report generation task request 1005 may specify a type of active report to be generated. In embodiments, an active report type may correspond to a type of report data.

In embodiments, an active report file comprising a set of the accessed data and an associated UI reference is generated 1315. In embodiments, the set of accessed data is a snapshot of the real-time data at a particular point in time. In embodiments, report data may be retrieved from one or more local or remote data sources, such as persistent data storage (e.g., a database) and/or computer memory. In embodiments, the set of report data to be retrieved may be specified in the active report generation task request 1005. In embodiments, the received report data may be organized and formatted into a data report such as a structured document (e.g. an XML document). In embodiments of method 1300, the retrieved set of report data may correspond to the set of data displayed by an RIA UI. In alternate embodiments, the retrieved set of report data may be a superset of the data displayed by the RIA UI, and may be selected for retrieval based on procedural logic.

In embodiments, the UI reference designates a network location of code that defines a second interactive UI, as discussed previously. In embodiments, the code is accessed from the network location and the second interactive UI is rendered when displaying the data from the active report file. In embodiments, the second interactive UI is the same or similar to the application interactive UI. This allows a user who does not have access to the RIA application to view the report data in an interactive UI that provides the same or similar interactive report functionality that is available to the application user via the application interactive UI. In alternative embodiments, the application interactive UI and the second interactive UI may be different interactive UIs that provide different report functionality.

In alternate embodiments of method 1300, the active report file may be generated by configuring an instance of an active report template 1035 as discussed previously.

E. Method for Displaying an Active Report

Figure 14:
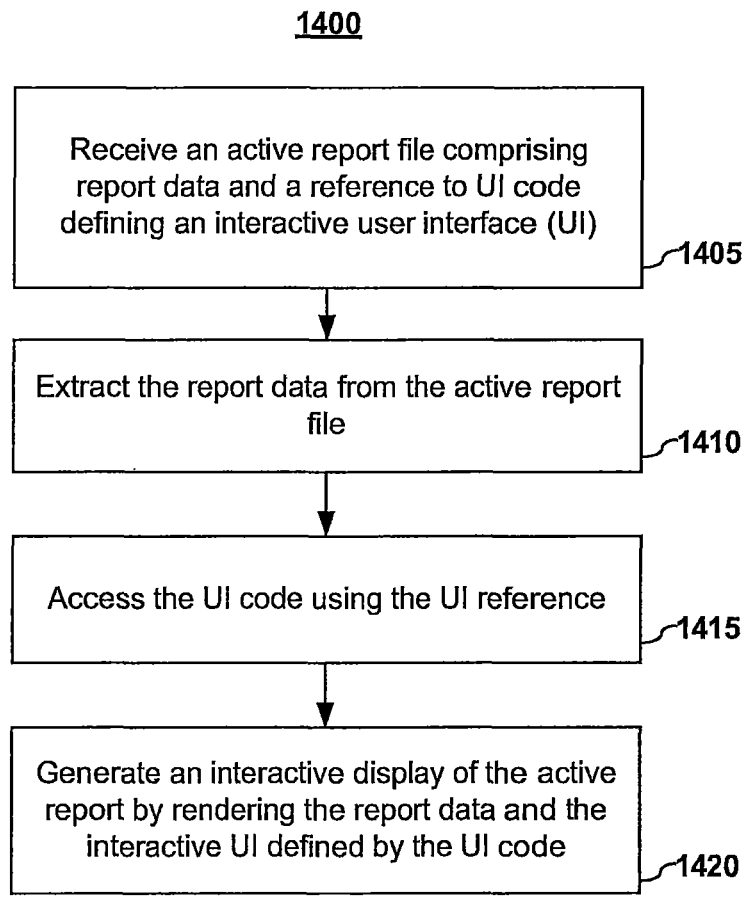
FIG. 14 depicts a method for displaying an active report according to various embodiments of the invention.

FIG. 14 depicts a method 1400 for displaying an active report according to various embodiments of the invention. In embodiments, method 1400 may be implemented in embodiments of active report display system 1200.

In embodiments, an active report file to be displayed is received 1405. In embodiments, the active report file to be displayed is included in an active report display task request 1205. In embodiments, the active report file comprises the report data and a reference to UI code to be rendered for display of the active report. As discussed previously, the UI reference may be a link designating the location of the UI code that defines the UI. In embodiments, the link may designate a location that is external to the active report file (e.g. a server on the Internet or other network location).

In embodiments, the report data are extracted 1410 from the active report file. In embodiments, the associated UI code is accessed 1415 using the UI reference extracted from the active report file. In embodiments, the UI code is retrieved from a remote location via a network connection. In embodiments, an interactive display of the active report is generated 1420 by rendering the report data and an interactive UI defined by the UI code on a local display device, such as a web browser on a computer.

F. Computing System Implementations

It shall be noted that the present invention may be implemented in any instruction-execution/computing device or system capable of processing data. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 15:
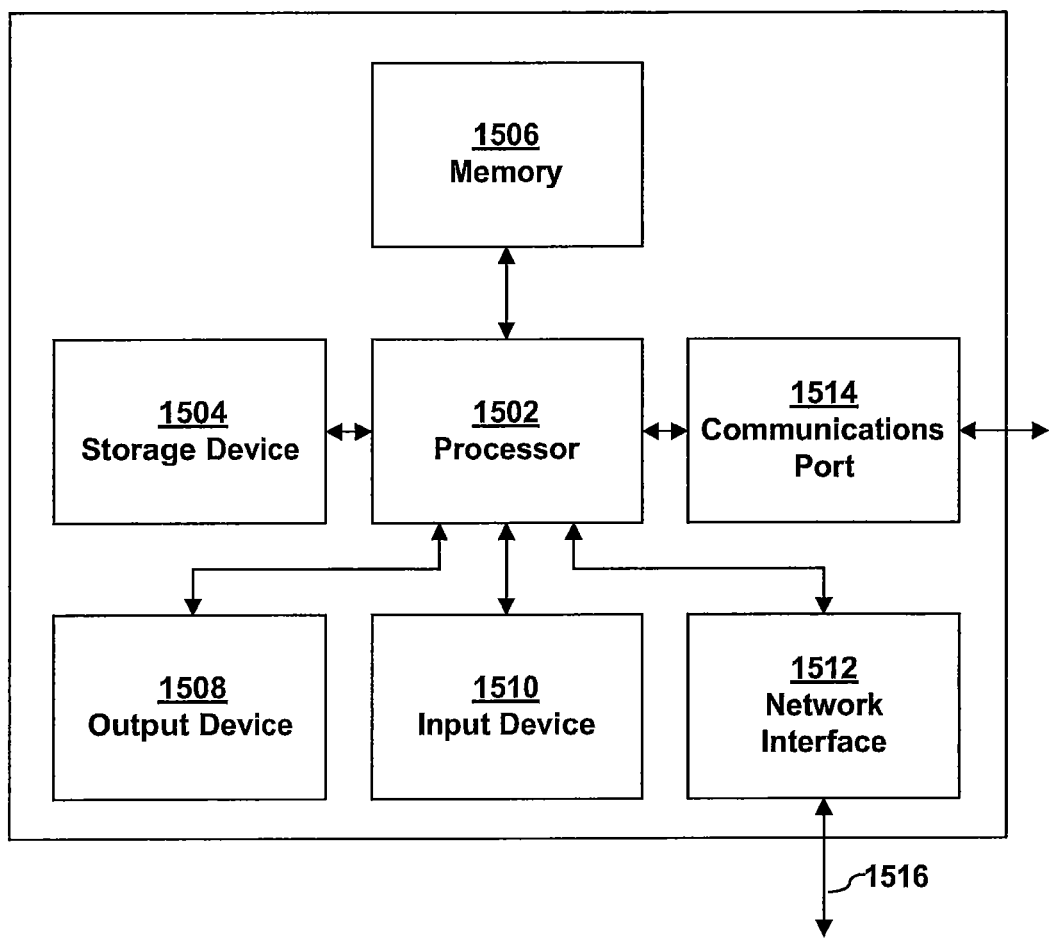
FIG. 15 is a block diagram of a computing system according to various embodiments of the invention.

FIG. 15 depicts a functional block diagram of an embodiment of an instruction-execution/computing device 1500 that may implement or embody embodiments of the present invention. As illustrated in FIG. 15, a processor 1502 executes software instructions and interacts with other system components. In an embodiment, processor 1502 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1504, coupled to processor 1502, provides long-term storage of data and software programs. Storage device 1504 may be a hard disk drive and/or another device capable of storing data, such as a magnetic or optical media (e.g., diskettes, tapes, compact disk, DVD, and the like) drive or a solid-state memory device. Storage device 1504 may hold programs, instructions, and/or data for use with processor 1502. In an embodiment, programs or instructions stored on or loaded from storage device 1504 may be loaded into memory 1506 and executed by processor 1502. In an embodiment, storage device 1504 holds programs or instructions for implementing an operating system on processor 1502. In one embodiment, possible operating systems include, but are not limited to, UNIX, AIX, LINUX, Microsoft Windows, and the Apple MAC OS. In embodiments, the operating system executes on, and controls the operation of, the computing system 1500.

An addressable memory 1506, coupled to processor 1502, may be used to store data and software instructions to be executed by processor 1502. Memory 1506 may be, for example, firmware, read only memory (ROM), flash memory, non-volatile random access memory (NVRAM), random access memory (RAM), or any combination thereof. In one embodiment, memory 1506 stores a number of software objects, otherwise known as services, utilities, components, or modules. One skilled in the art will also recognize that storage 1504 and memory 1506 may be the same items and function in both capacities. In an embodiment, one or more of the components of FIGS. 2, 10A, 10B, and 12 may be modules stored in memory 1504 and/or storage 1506, and executed by processor 1502.

In an embodiment, computing system 1500 provides the ability to communicate with other devices, other networks, or both. Computing system 1500 may include one or more network interfaces or adapters 1512, 1514 to communicatively couple computing system 1500 to other networks and devices. For example, computing system 1500 may include a network interface 1512, a communications port 1514, or both, each of which are communicatively coupled to processor 1502, and which may be used to couple computing system 1500 to other computer systems, networks, and devices.

In an embodiment, computing system 1500 may include one or more output devices 1508, coupled to processor 1502, to facilitate displaying graphics and text. Output devices 1508 may include, but are not limited to, a display, LCD screen, CRT monitor, printer, touch screen, or other device for displaying information. Computing system 1500 may also include a graphics adapter (not shown) to assist in displaying information or images on output device 1508.

One or more input devices 1510, coupled to processor 1502, may be used to facilitate user input. Input device 1510 may include, but are not limited to, a pointing device, such as a mouse, trackball, or touchpad, and may also include a keyboard or keypad to input data or instructions into computing system 1500.

In an embodiment, computing system 1500 may receive input, whether through communications port 1514, network interface 1512, stored data in memory 1504/1506, or through an input device 1510, from a scanner, copier, facsimile machine, or other computing device.

In embodiments, computing system 1500 may include one or more databases, some of which may store data used and/or generated by programs or applications. In embodiments, one or more databases may be located on one or more storage devices 1504 resident within a computing system 1500. In alternate embodiments, one or more databases may be remote (i.e. not local to the computing system 1500) and share a network 1516 connection with the computing system 1500 via its network interface 1514. In various embodiments, a database may be a relational database, such as an Oracle database, that is adapted to store, update, and retrieve data in response to SQL-formatted commands.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the spirit and scope of the present invention. It is therefore intended that the following claims include such modifications, permutation, and equivalents as fall within the spirit and scope of the present invention.

The invention claimed is:

1. A non-transitory computer-readable medium storing instructions which, when executed by one or more processors, cause the one or more processors to perform operations comprising:
   receiving from a first user a request for a report, the first user not having local access to a first application interactive user interface (UI) defined by a set of software components rendered local to the application;
   in response to receiving the request, retrieving report data from a database and generating a file that
   (a) contains the report data,
   (b) lacks code defining a second application interactive UI that generates graphical features with which the first user can interact to cause a device of the first user to alter a presentation of the report data on a display of the device of the first user, and
   (c) contains a reference that the device of the first user follows to obtain the code over a network; and
   sending the file to the device of the first user to process the report data by using the reference to access the code defining the second application interactive UI by the device of the first user to present the report data as the report within a user interface
   (a) that is customized based on an identity of the first user,
   (b) having a look and feel that is identical to a look and feel of the first application interactive UI accessed by a second user that provides real-time access by the second user to the database, and
   (c) that is interactive to allow the first user to selectively display and interact with the report data.

2. The non-transitory computer-readable medium of claim 1, wherein receiving the request comprises receiving the request through a command line interface.

3. The non-transitory computer-readable medium of claim 1, wherein the first user lacks access to a particular interface-generating framework that generates the graphical features for applications that interact with the framework.

4. The non-transitory computer-readable medium of claim 1, wherein sending the file comprises e-mailing the file to the first user.

5. The non-transitory computer-readable medium of claim 1, wherein the file is a hypertext markup language (HTML) file that cannot express the graphical features in HTML.

6. The non-transitory computer-readable medium of claim 1, wherein the graphical features include a set of tabs that can be alternatively selected, by the first user, to view different aspects of the report data.

7. The non-transitory computer-readable medium of claim 1, wherein the operations further comprise:
accessing the report data and causing the report data to be displayed to a particular user of the application via an application interactive user interface (UI) defined by a set of software components rendered local to the application.

8. The non-transitory computer-readable medium of claim 7, wherein the report data are performance data for a system.

9. The non-transitory computer-readable medium of claim 7, wherein generating the file comprises:
generating an active report file comprising the report data and a user interface (UI) reference, the UI reference designating one of a plurality of network locations of code defining a corresponding second interactive UI to be rendered when displaying at least some of the report data to a non-accessor user of the application.

10. The non-transitory computer-readable medium of claim 9, wherein the one of the plurality of network locations is designated by the UI reference based on an identity of the non-accessor user of the application.

11. The non-transitory computer-readable medium of claim 1, wherein the device of the first user lacks, at a time of the generating of the file, code that generates the graphical features.

12. The non-transitory computer-readable medium of claim 1, wherein the code is an Adobe Flash Small Web Format file.

13. The non-transitory computer-readable medium of claim 12, wherein the reference is a uniform resource identifier (URI) that specifies a location, on the network, from which the Adobe Flash Small Web Format file can be downloaded.

14. The non-transitory computer-readable medium of claim 1, wherein the code defines graphical animation and sound.

15. The non-transitory computer-readable medium of claim 1, wherein the code, when processed by the device of the first user, causes the device of the first user to present the data within a user interface having a look and feel that is identical to a look and feel of an application that accesses the code through a framework that is stored on a same device on which the application executes.

16. The non-transitory computer-readable medium of claim 1, wherein the device of the first user lacks the real-time access to the database.

17. A method for providing interactive report functionality, the method comprising:
receiving a request for a report from a first user not having local access to a first application interactive user interface (UI) defined by a set of software components rendered local to the application;
in response to receiving the request, retrieving report data from a database and generating a file that
  (a) contains the report data,
  (b) lacks code defining a second application interactive UI that generates graphical features with which the first user can interact to cause a device of the first user to alter a presentation of the report data on a display of the device of the first user, and
  (c) contains a reference that the device of the first user follows to obtain the code over a network; and
sending the file to the device of the first user to process the report data by using the reference to access the code defining the second application interactive UI by the device of the first user to present the report data as the report within a user interface
  (a) that is customized based on an identity of the first user,
  (b) having a look and feel that is identical to a look and feel of the first application interactive UI accessed by a second user that provides real-time access by the second user to the database, and
  (c) that is interactive to allow the first user to selectively display and interact with the report data.

18. A system for providing interactive report functionality, the system comprising:
a computer comprising memory and one or more microprocessors; and
an active report generator executing on the computer that, in response to receiving a request for a report from a first user not having local access to a first application interactive user interface (UI) defined by a set of software components rendered local to the application retrieves report data from a database and generates a file that
  (a) contains the report data,
  (b) lacks code defining a second application interactive UI that generates graphical features with which the first user can interact to cause a device of the first user to alter a presentation of the report data on a display of the device of the first user, and
  (c) contains a reference that the device of the first user follows to obtain the code over a network; and
sends the file to the device of the first user to process the report data by using the reference to access the code defining the second application interactive UI by the device of the first user to present the report data as the report within a user interface
  (a) that is customized based on an identity of the first user,
  (b) having a look and feel that is identical to a look and feel of the first application interactive UI accessed by a second user that provides real-time access by the second user to the database, and
  (c) that is interactive to allow the first user to selectively display and interact with the report data.

* * * * *

UNITED STATES PATENT AND TRADEMARK OFFICE
CERTIFICATE OF CORRECTION

PATENT NO. : 10,482,161 B2
APPLICATION NO. : 14/924429
DATED : November 19, 2019
INVENTOR(S) : Chan et al.

It is certified that error appears in the above-identified patent and that said Letters Patent is hereby corrected as shown below:

On the Title Page

In Column 2, under Other Publications, Line 1, delete "Altidan" and insert -- Atidan --, therefor.

In the Specification

In Column 7, Line 40, delete "10" and insert -- IO --, therefor.

In Column 7, Line 40, delete "10" and insert -- IO --, therefor.

In Column 7, Line 46, delete "10" and insert -- IO --, therefor.

In Column 7, Line 46, delete "10" and insert -- IO --, therefor.

In Column 8, Line 52, delete "10" and insert -- IO --, therefor.

In Column 8, Line 53, delete "10" and insert -- IO --, therefor.

In Column 8, Line 56, delete "10" and insert -- IO --, therefor.

In Column 8, Line 57, delete "10" and insert -- IO --, therefor.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*